(12) United States Patent
Fernando et al.

(10) Patent No.: US 9,344,350 B2
(45) Date of Patent: May 17, 2016

(54) VIRTUAL SERVICE TOPOLOGIES IN VIRTUAL PRIVATE NETWORKS

(71) Applicant: CISCO TECHNOLOGY, INC., San Jose, CA (US)

(72) Inventors: Rex Fernando, Dublin, CA (US); Dhananjaya Rao, Milpitas, CA (US); Jim Guichard, New Boston, NH (US); Paul Quinn, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 13/865,926

(22) Filed: Apr. 18, 2013

(65) Prior Publication Data

US 2014/0313928 A1     Oct. 23, 2014

(51) Int. Cl.
*H04L 12/28* (2006.01)
*H04L 12/751* (2013.01)
*H04L 12/931* (2013.01)

(52) U.S. Cl.
CPC .............. *H04L 45/02* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 8,316,435 B1* | 11/2012 | Varadhan et al. | 726/15 |
| 8,937,961 B1* | 1/2015 | Vairavakkalai | 370/401 |
| 2009/0168666 A1* | 7/2009 | Unbehagen et al. | 370/254 |
| 2010/0008253 A1* | 1/2010 | Mellachervu et al. | 370/254 |
| 2013/0272305 A1* | 10/2013 | Lefebvre | H04L 47/24 370/392 |
| 2014/0098673 A1* | 4/2014 | Lee | H04L 45/64 370/238 |

OTHER PUBLICATIONS

IETF RFC 4659, "BGP-MPLS IP Virtual Private Network (VPN) Extension for IPv6 VPN", J. De Clercq, Sep. 2006.
IETF RFC 4364, "BP/MPLS IP Virtual Private Networks (VPNs)", E. Rosen et al., Feb. 2006.
IETF RFC 4684,"Constrained Route Distribution for Border Gateway Protocol/Multiprotocol Label Switching Internet Protocol Virtual Private Networks", P.Marques,Nov. 2006.

* cited by examiner

*Primary Examiner* — Rebecca Song
(74) *Attorney, Agent, or Firm* — Cindy Kaplan

(57) ABSTRACT

In one embodiment, a method includes storing a service topology route at a network device interconnecting at least two zones comprising a plurality of hosts, and propagating the service topology route to create a service chain comprising a service node in communication with the network device. The service topology route creates a forwarding state at network devices in the service chain for use in inter-zone routing in a virtual private network. An apparatus and logic are also disclosed herein.

20 Claims, 5 Drawing Sheets

VIRTUAL SERVICE TOPOLOGIES IN VIRTUAL PRIVATE NETWORKS

TECHNICAL FIELD

The present disclosure relates generally to communication networks, and more particularly, to services in virtual private networks.

BACKGROUND

Network topologies and routing in the enterprise, data center, and campus networks reflect the needs of organizations in terms of performance, scale, security, and availability. For scale and security reasons, networks are often composed of multiple small domains, each serving one or more logical functions of the organization. Hosts within a domain can freely communicate with one another but traffic between hosts in different domains is subjected to additional services that help in scaling and securing the end applications.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
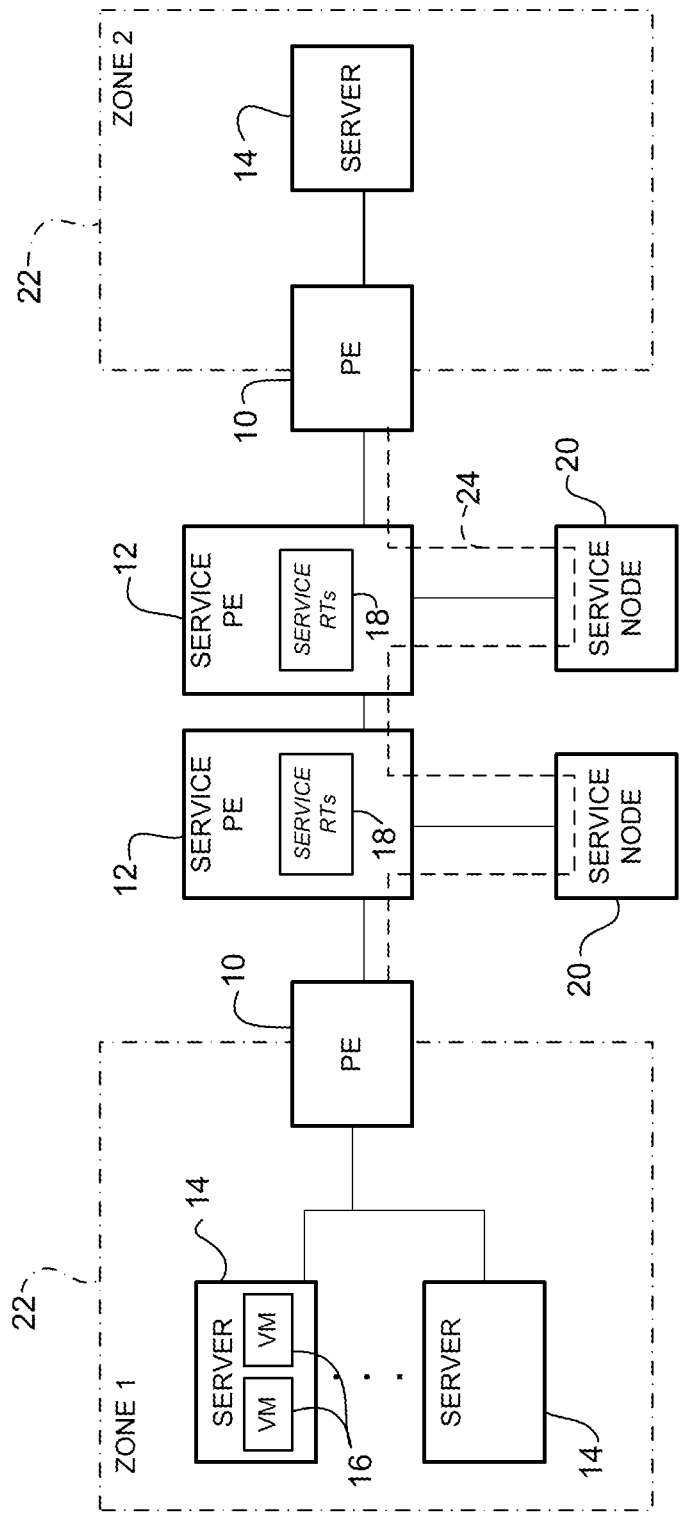
FIG. 1 illustrates an example of a network in which embodiments described herein may be implemented.

In one embodiment, a method generally comprises storing a service topology route at a network device interconnecting at least two zones comprising a plurality of hosts, and propagating the service topology route to create a service chain comprising a service node in communication with the network device. The service topology route creates a forwarding state at network devices in the service chain for use in inter-zone routing in a virtual private network.

In another embodiment, an apparatus generally comprises a processor for creating a forwarding state at the apparatus and processing traffic in a virtual service topology based on the forwarding state, the virtual service topology connecting at least two zones comprising a plurality of hosts, through at least one service node. The apparatus further comprises memory for storing a service topology route generated at a network device in the virtual service topology and propagated to create a service chain for inter-zone traffic.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Networks such as enterprise, data center, and campus networks may be configured with multiple zones to provide scalability and security. Overlay mechanisms, which provide the ability to create virtual network topologies that mimic physical networks and the ability to constrain the flow of routing of traffic over these virtual network topologies, are needed in order to port a network with all of its functions and infrastructure elements to a virtualized data center.

Networks may also need multiple virtual topologies per tenant in order to handle different types of application traffic. For example, each tenant may dictate a different topology between their zones and applications and may need the ability to apply network policies and services for inter-zone traffic in a manner specific to their organizational objectives. It may be desirable for the overlay mechanisms to be flexible to accommodate the specific needs of the tenant and their applications and at the same time robust enough to satisfy the scale, performance, and high availability needs that they demand from the virtual network infrastructure.

Certain embodiments described herein may be used to construct virtual network topologies in networks such as data centers. As described in detail below, the embodiments extend virtual private network (VPN) control plane mechanisms to constrain routing and traffic flow over virtual service topologies. These virtual service topologies interconnect network zones and help to constrain the flow of traffic between zones so that services can be applied.

Referring now to the drawings, and first to FIG. 1, an example of a network in which embodiments described herein may be implemented is shown. The embodiments operate in the context of a data communication network including multiple network devices. The network may be configured for use as a data center or any other type of network (e.g., campus, enterprise, and the like). For simplification, only a small number of nodes are shown. It is to be understood that the network shown in FIG. 1 is only an example and that other networks comprising different network devices or topologies may be used without departing from the scope of the embodiments.

The network shown in FIG. 1 includes two provider edge (PE) nodes 10 in communication via service provider edge (SPE) nodes 12. Each PE node 10 is in communication with one or more network devices 14 (e.g., servers, physical machines), which may comprise virtual machines 16. Each PE node 10 may be in communication with any number of servers 14 and each server may comprise any number of virtual machines 16. Each server 14 may also be in communication with multiple PE nodes 10 to provide redundancy for improved network reliability. A collection of hosts (physical machines 14, virtual machines 16) that can communicate freely form a zone 22.

The server 14 may be, for example, a blade server, rack server, or any other type of network device operable to host applications or virtual machines where applications reside. The servers 14 may host application servers or remotely hosted virtual machine applications for use at end user equipment (end stations, client devices).

The virtual machines 16 share hardware resources without interfering with each other, thus enabling multiple operating systems and applications to execute at the same time on a single computer. The virtual machines 16 may be used, for example, in a virtual infrastructure to dynamically map physical resources to business needs. A virtual machine monitor such as hypervisor may dynamically allocate hardware resources to the virtual machines 16.

The network devices 10, 12 may be switching or routing devices, or other network devices configured to perform forwarding functions. The network device 12 may be, for example, a switch (e.g., NEXUS 7000 series switch available from Cisco Systems, Inc. of San Jose, Calif.) or a router (e.g., Cloud Services Router (CSR) available from Cisco Systems, Inc.). It is to be understood that these are only examples of network devices that may be used to implement the embodiments described herein.

The network devices 10, 12 may include one or more forwarding information bases (FIBs), label information bases (LIBs), or other data structure used in performing switching or forwarding functions. As described in detail below, each FIB includes service route targets (RTs) 18 (e.g., service import RT, service export RT, service topology RT, or any combination thereof), which are used to create a service chain 24.

In one embodiment, the service PE 12 is a layer 3 VPN (L3VPN) device that recognizes and directs the appropriate traffic flows to its attached service node 20 through VPN label lookup. The service node 20 may be a physical or virtual service appliance that inspects or impacts the flow of inter-zone traffic. Examples of service nodes include firewalls, load-balancers, deep packet inspectors, and the like. The service node 20 may be integrated or attached to the service PE 12 or physically independent therefrom.

In one example, the servers 14 are located in a data center and host virtual machines 16 where end applications reside. Each virtual machine 16 that runs an application is a customer edge (CE) from a VPN perspective and may be referred to as a CE/VM. As noted above, a collection of virtual machines that can communicate freely form a zone. In the example of FIG. 1, each PE 10 and associated servers 14 and virtual machines 16 are located in a zone 22 (zone 1, zone 2). The PE 10 is the first hop node from the CE/VM 16 and the PE-CE link is a single hop from an L3 perspective. Any physical, logical, or tunneling technology may be used to create a direct link between the CE/VM 16 and its attached PE 10. The PE 10 helps to create the zone 22 that the CE belongs to by placing the CE-PE link in a VRF (VPN routing and forwarding) corresponding to that zone. Intra-zone connectivity is achieved by designating an RT (Route Target) per zone (zone-RT) that is applied on all PE VRFs that terminate the CE/VMs 16 belonging to the zone.

Since inter-zone services may not always reside inline on a PE, it may be appropriate to virtualize the services themselves so that they can be implemented on various nodes and scaled when traffic demands increase. For example, inter-zone communication may dictate a different topology of connectedness between zones and applications and there may be a need to apply network policies and services for inter-zone traffic in a specific manner. Inter-zone traffic should therefore follow a predetermined service path and forwarding through one or more service functions.

Certain embodiments described herein allow inter-zone traffic to be directed through the appropriate set of services nodes 20, which may be remote and virtualized. As described below, a sequence of service PEs 12 and their corresponding service nodes 20 creates the service chain for inter-zone traffic. The service chain is unidirectional and creates a one way traffic flow between a source zone and a destination zone. A bidirectional service chain may be constructed using two unidirectional service chains. In the example shown in FIG. 1, service path 24 extends between the two zones 22, and includes a service chain extending from PE 10 in zone 1 to the SPE 12 closest to zone 2 for transmitting traffic from zone 1 to zone 2. Similarly, the service path 24 may also include a service chain extending from the PE 10 in zone 2 to the SPE 12 closest to zone 1 for transmitting traffic from zone 2 to zone 1. The PE 10 closest to the source is the source service PE and the service PE 12 closest to the destination zone is the destination service PE. Construction of the virtual service topology and inter-zone routing along the service chain are described in detail below with respect to FIGS. 4 and 5.

Figure 2:
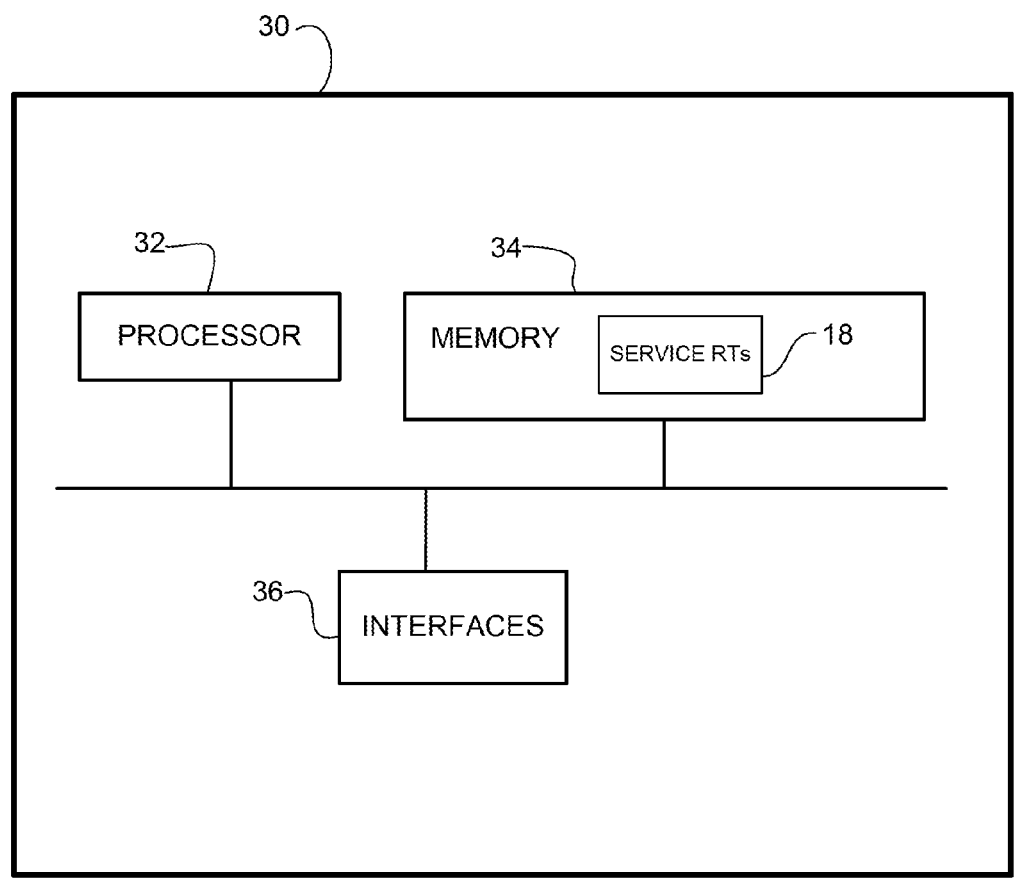
FIG. 2 depicts an example of a network device useful in implementing embodiments described herein.

An example of a network device (e.g., service PE) 30 that may be used to implement embodiments described herein is shown in FIG. 2. In one embodiment, network device 30 is a programmable machine that may be implemented in hardware, software, or any combination thereof. The device 30 includes one or more processor 32, memory 34, and network interfaces 36. Memory 34 may be a volatile memory or non-volatile storage, which stores various applications, modules, and data for execution and use by the processor 32. For example, memory 34 may include an FIB comprising service RTs 18 or other data structures or code.

Logic may be encoded in one or more tangible computer readable media for execution by the processor 32. For example, the processor 32 may execute codes stored in a computer readable medium such as memory 34. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 36 may comprise any number of interfaces (linecards, ports) for receiving data or transmitting data to other devices. The interface 36 may include, for example, an Ethernet interface for connection to a computer or network.

It is to be understood that the network device 30 shown in FIG. 2 and described above is only an example and that network devices having different components and configurations may be used without departing from the scope of the embodiments. For example, the network device 30 may further include any suitable combination of hardware, software, algorithms, processors, devices, components, or elements operable to facilitate the capabilities described herein.

Figure 3:
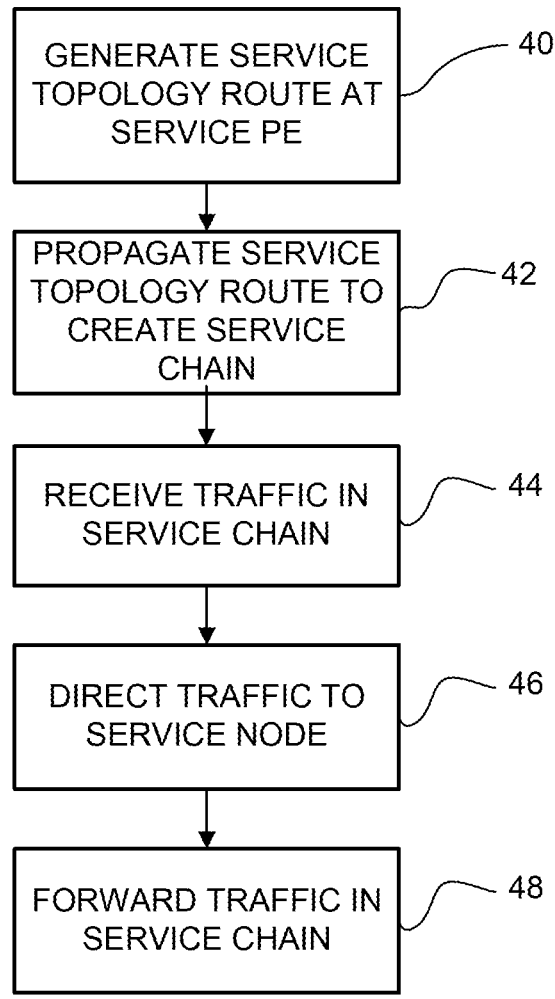
FIG. 3 is a flowchart illustrating an overview of a process for creating a virtual service topology and performing inter-zone traffic forwarding, in accordance with one embodiment.

In certain embodiments, the inter-zone model described above may be implemented in two primary steps. The first step involves creating the virtual service topology that ties two or more zones 22 through one or more service nodes 20. The second step provides inter-zone routing and service chaining. Although two primary steps are described, the present disclosure contemplates the inter-zone model described above being implemented using any suitable number of steps, according to particular needs. FIG. 3 is a flowchart illustrating an overview of a process for creating and using a virtual service topology, in accordance with one embodiment. An example of a process for creating a virtual service topology is further described with respect to FIG. 4 and an example illustrating inter-zone routing and service chaining is shown in FIG. 5.

Referring now to the flowchart of FIG. 3, a virtual service topology is first created. Creating a virtual service topology may include generating (e.g., originating) a service topology route at a destination SPE 12 (step 40) and propagating the service topology route through a series of SPEs 12 to create a service chain (step 42). The service chain may be created through the provisioning of service route targets at the service PEs 12. The service topology route may create a forwarding state at the network devices (service PEs) in the service chain for use in inter-zone routing in the VPN. At each service hop in the service chain, the SPE 12 may direct received traffic to the service node 20 (steps 44 and 46). Once the service node 20 is done processing the traffic, the service node sends it back to the SPE 12, which may forward the traffic to the next SPE in the service chain (step 48).

It is to be understood that the process shown in FIG. 3 and described above is only an example and that steps may be added, deleted, or modified without departing from the scope of the embodiments. For example, only the destination SPE generates the service topology route. The destination and intermediate SPEs store and propagate the service topology route.

Figure 4:
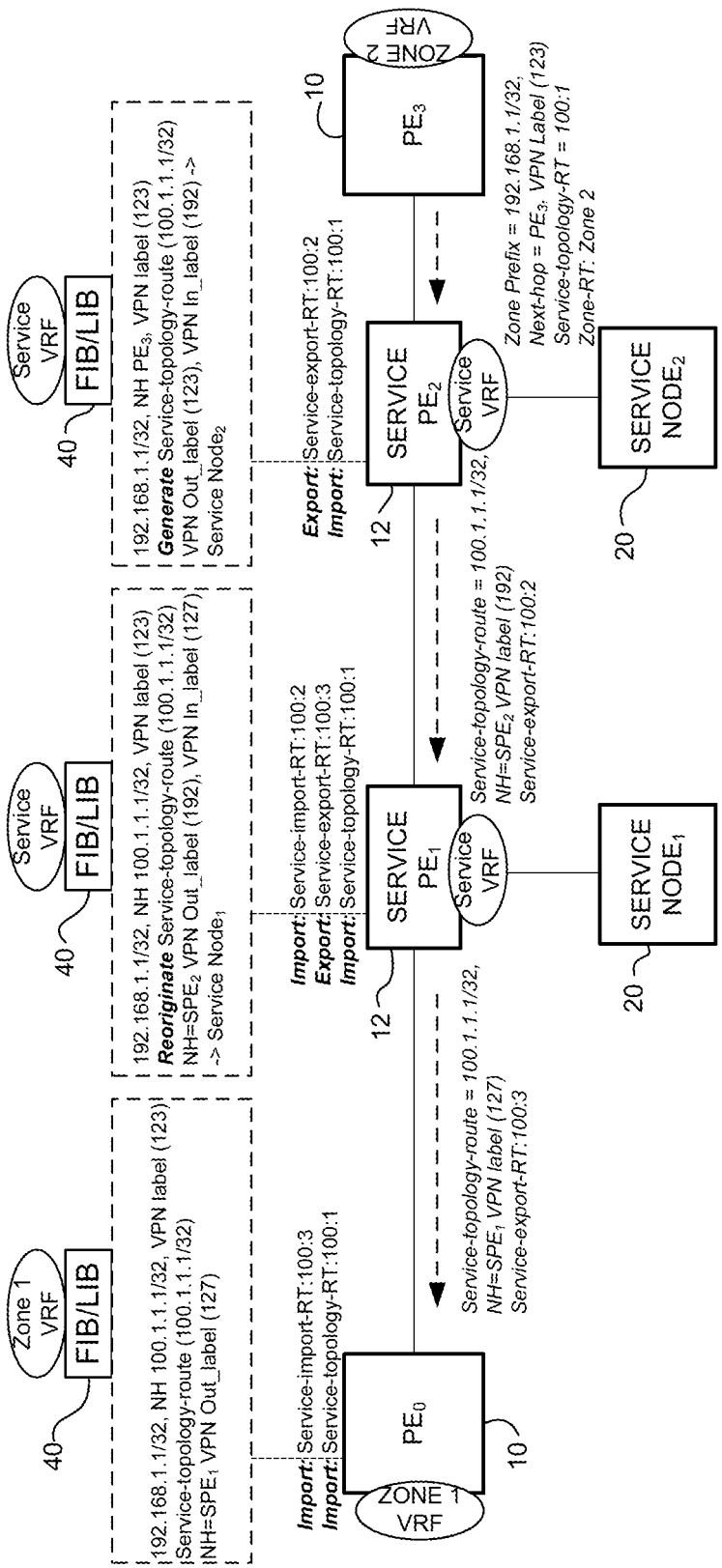
FIG. 4 illustrates virtual service topology construction, in accordance with one embodiment.
Figure 5:
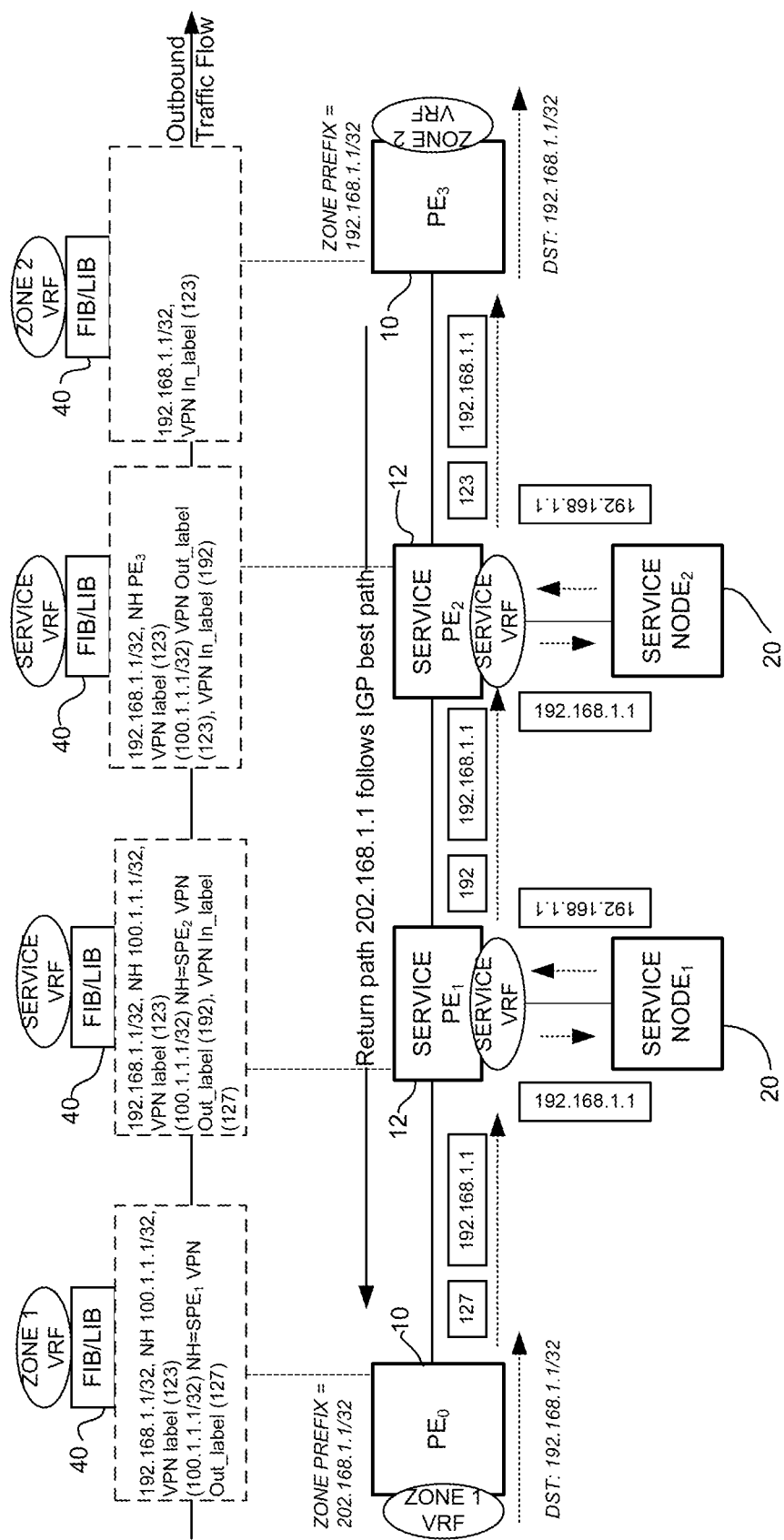
FIG. 5 illustrates inter-zone traffic forwarding, in accordance with one embodiment.

FIG. 4 illustrates a process for constructing the virtual service topology, in accordance with one embodiment. In this example, the network includes two zones, zone 1 and zone 2. For simplification only the PE nodes 10 are shown in each zone. Zone 1 includes $PE_0$ and zone 2 includes $PE_3$. The zones are interconnected via two service provide edge nodes 12 ($SPE_1$ and $SPE_2$). $SPE_1$ and $SPE_2$ are each connected to a service node 20 (service node$_1$ and service node$_2$, respectively). An FIB/LIB 40 is shown above respective PE nodes (Zone 1 VRF above $PE_0$, Service VRFs above respective SPEs).

As previously discussed, in this example the virtual service topology ties two or more zones through one or more service nodes 20 to create a service chain. This may be done by originating a service topology route that creates the route resolution state (forwarding state) for zone prefixes in the set of service PEs 12. Routes representing hosts (physical machines 14, virtual machines 16) from a zone 22 are called zone prefixes. In the example shown in FIG. 1, zone 2 has a zone prefix of 192.168.1.1/32. The service topology route is originated in the destination SPE 12 and propagated through the series of SPEs from the destination SPE to the source service PE. In the example shown in FIG. 4, service $PE_2$ ($SPE_2$) is the destination service PE and $PE_0$ is the source service PE for a service chain used to forward traffic from zone 1 to zone 2.

The SPEs 12 are configured to allow for automatic and constrained propagation of service topology routes through the SPEs that form the service chain. The SPE 12 in a given service chain is provisioned to accept the service topology route and re-originate it so that the upstream SPE imports it. The sequential import and export of the service topology route along the service chain is controlled by RTs (route targets) provisioned at each SPE.

The terms 'upstream' and 'downstream' as used herein refer to the direction of traffic flow from source to destination. In the example shown in FIG. 4, traffic flows downstream from zone 1 to zone 2. The service chain is originated at the destination $SPE_2$ and re-originated upstream towards the source.

In order to create the service chain and give it a unique identity, each SPE 12 may be provisioned with service RTs for each service chain to which it belongs. The service RTs may include a service-import-RT, service-export-RT, and service-topology-RT. Service-import-RT may import any route that caries the RT into the service VRF. Also, any route that was imported using the service-import-RT may be automatically re-originated with the corresponding service-export-RT. The next-hop of the re-originated route points to the service node 20 attached to the SPE 12. The VPN label carried in the re-originated route directs traffic received by the SPE 12 to the service node 20.

The service-export-RT of a downstream SPE is equal to the service-import-RT of the immediate upstream SPE. As shown in FIG. 4, for example, service-export-RT for $SPE_2$ is 100:2 and service-import-RT for $SPE_1$ is also 100:2. The service topology route may be originated in the destination SPE carrying its service-export-RT. The flow of the service topology route may create both the service chain and the route resolution state for the zone prefixes.

The presence of the service topology route in SPE 12 may trigger the addition of the service-topology-RT to the import RTs of the service VRF. In certain embodiments, every service chain has a single unique service-topology-RT that is provisioned in all participating SPEs.

The service RTs that establish the chain and give it its identity can be pre-provisioned or activated due to the appearance of an attached virtual service node. In certain embodiments, the provisioning system is assumed to have the intelligence to create loop-free virtual service topologies.

Referring again to FIG. 4, an example of the creation of a service topology route for traffic transmitted from zone 1 to zone 2 is shown. As $SPE_2$ has no import-RT for the service topology route associated with service-topology-RT:100:1, it becomes the destination SPE and generates the service topology route with itself as the next-hop. $SPE_2$ is provisioned with service-topology-RT:100:1 and service-export-RT:100:2. The destination SPE has a NULL service-import-RT. This is so that $SPE_2$ knows it is the end of the service chain. $SPE_2$ generates the service topology route (100.1.1.1/32) with itself as the next-hop.

$SPE_1$ is provisioned with service-import-RT:100:2, service-export-RT:100:3, and service-topology-RT:100:1. Since $SPE_1$ has an import statement associated with the service topology route, it is not the destination SPE. $SPE_1$ rewrites the next-hop in its FIB 40 for any zone prefix that carries the service-topology-RT to the associated service topology route and re-originates the service topology route with itself as the next-hop.

$PE_0$ imports service-import-RT:100:3 and service-topology-RT:100:1. $PE_0$ has no export-RT for the service topology route associated with service-topology-RT:100:1 and becomes the source service PE. $PE_0$ rewrites the next-hop in its FIB 40 for any zone prefix that carries the service-topology-RT to the service topology route.

In this manner, the flow of the service topology route creates the route resolution state through a set of SPEs for the actual zone prefixes. In certain embodiments, there should be one service topology route per virtual service topology. There may be multiple virtual service topologies and hence service topology routes for a given VPN.

As previously noted, virtual service topologies are typically constructed unidirectionally. Between the same pair of zones, traffic in opposite directions is supported by two service topologies and two service routes. These two service topologies may or may not be symmetrical (i.e., they may or may not traverse the same SPEs/service nodes in opposite directions).

A service topology route may be advertised with a per-next-hop label that directs incoming traffic to the attached service node 20. Additionally or alternatively, an aggregate label may be used for the service route and an IP route lookup performed at the SPE 12 to send traffic to the service node 20.

A new service node 20 can be seamlessly inserted by configuring the three service RTs in the attached SPE 12. This technique may be used to elastically scale out the service nodes 20 with traffic demand.

In certain embodiments, the distribution of the service topology route itself may be controlled by RT constraints to only interested SPEs.

It should be noted that the service topology route may be independent of the zone prefixes, which are the actual addresses of the hosts (e.g., VMs 16) present in the various zones. The zone prefixes use the service topology route to resolve their next-hop.

FIG. 5 illustrates an example of inter-zone routing and service chaining, in accordance with one embodiment. This involves creating the forwarding state for the actual zone prefixes. The forwarding state created by the service topology route in the service PEs 12 is used by the actual zone prefixes, making the traffic destined to them flow through the virtual service topology. Traffic for the zone prefix goes through the service hops created by the service topology route. At each service hop, the service PE 12 directs the traffic to the service node 20. Once the service node is done processing the traffic, it sends it back to the service PE, which forwards the traffic to the next service PE in the service chain.

The zone prefix has its intra-zone RTs attached when it is originated. This is used by PEs 10 in the same zone to import these prefixes to enable direct communication between VMs 16 in the same zone. In addition to the intra-zone RTs, zone prefixes are also tagged with the set of service-topology-RTs that they belong to at the point of origination. A zone prefix can have multiple such service-topology-RTs attached to it, as it can be part of different service topologies.

Since the zone prefixes are tagged with the service-topology-RT, they get imported into the appropriate service VRFs of particular service PEs that form the service chain associated with that topology RT. The topology RT was added to the relevant service VRFs import RT list during the virtual topology construction phase described above.

A zone prefix also carries a virtual next-hop that is associated with the service topology. This next-hop is called the service-next-hop and is carried in addition to the actual next-hop. The service-next-hop is resolved by a service topology route, and is resolved differently at different points in the service topology. The service-next-hop at each service PE 12 gets resolved via the service topology route advertised by the previous service PE.

In one example, once the zone prefixes are imported into the service PE 12, their next-hops are resolved as follows:

If the importing SPE is the destination SPE, it uses the next-hop that came with the zone prefix for route resolution. It also uses the VPN label that came with the prefix (see FIB for SPE$_2$ in FIG. 5).

If the importing SPE is not the destination SPE, it rewrites the received next-hop of the zone prefix with the service topology route (see FIB for SPE$_1$ in FIG. 5).

In an MPLS VPN, the zone prefixes come with VPN labels. The labels are ignored when a service next-hop is being used (e.g., intermediate SPE$_1$). Instead, the zone prefix is resolved via the service topology route and uses the associated service route's VPN label. The zone prefixes in the intermediate SPE hops recurse over the service topology route forcing the traffic destined to them to flow through the virtual service topology.

The last SPE (in the direction of traffic flow) in the service chain installs the zone prefix with the actual next-hop. In the example of FIG. 5, SPE$_2$ uses the VPN label advertised by the originator, along with the actual next-hop.

Traffic destined for the zone prefix (target zone) goes through the service hops created by the service topology route. At each service hop, the SPE 12 directs the traffic to the service node 20. Once the service node 20 is done processing the traffic, it then sends it back to the SPE 12, which forwards the traffic to the next SPE.

A significant benefit of next-hop indirection is avoiding redundant advertisement of zone prefixes from the SPEs 12. Also, when the virtual service topology is changed (due to addition or removal of SPEs), there should be no change to the zone prefix's import/export RT configuration.

The zone prefix carries an additional attribute referred to as the service topology attribute. In one embodiment, this is a TLV (type-length-value) and contains multiple tuples of service topology instances. Each service topology instance consists of service topology RT and service next-hop.

For BGP (Border Gateway Protocol), the service topology attribute is a non-transitive optional BGP attribute. In one example, the service topology attribute consists of one or more instances of the service topology as follows:

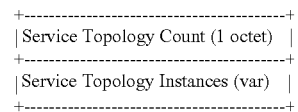

Where a service topology has a tuple:

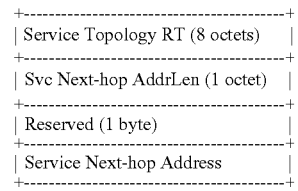

The service next-hop address may be specified identical to the corresponding BGP next-hop in the MP-Reach attribute for VPN AFs, as described in IETF RFC 4364 ("BGP/MPLS IP Virtual Private Networks (VPNs)", E. Rosen et al., February 2006) and IETF RFC 4659 ("BGP-MPLS IP Virtual Private Network (VPN) Extension for IPv6 VPN", J. De Clercq et al., September 2006).

It should be noted that the embodiments introduce a change in the behavior of the SPEs but do not require any protocol changes to BGP. Also, it is to be understood that BGP is only one example of a protocol that may be used to transmit the service topology information and that other protocols may also be used.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    storing a service topology route for routing traffic through a plurality of services, at a service provider edge node interconnecting at least two zones comprising a plurality of hosts;
    propagating the service topology route through a plurality of service provider edge nodes to create a service chain comprising a sequence of the service provider edge nodes and corresponding service nodes for inter-zone traffic, said service chain comprising a series of service functions that said inter-zone traffic traverses; and forwarding said inter-zone traffic on a service path and through said series of service functions defined by said service chain;

wherein the service topology route identifies a virtual service topology and creates a forwarding state at the service provider edge nodes in said service chain, said virtual service topology interconnecting the zones to constrain traffic flow in a virtual private network between the zones for application of services.

2. The method of claim 1 wherein storing the service topology route comprises provisioning a service route target at the service provider edge node.

3. The method of claim 2 wherein the service route target comprises a service topology route target and at least one of a service import route target and a service export route target.

4. The method of claim 1 further comprising creating at the service provider edge node, the forwarding state for a zone prefix.

5. The method of claim 1 further comprising receiving traffic in said service chain, forwarding the traffic to one of the service nodes, receiving the traffic from the service node, and forwarding the traffic in said service chain towards a destination.

6. The method of claim 1 wherein the service provider edge nodes each comprise a layer 3 virtual private network device.

7. The method of claim 1 further comprising receiving a control plane message comprising service topology information.

8. The method of claim 1 wherein the service provider edge node comprises a destination service device and further comprising generating the service topology route.

9. The method of claim 1 wherein the service provider edge nodes in the service chain comprise a source service device and a destination service device, the source service device provisioned with a service topology route target and a service import route target, the destination service device provisioned with a service topology route target and a service export route target.

10. An apparatus comprising:
a processor for creating a forwarding state at the apparatus and processing traffic in a virtual service topology based on said forwarding state, the virtual service topology connecting at least two zones comprising a plurality of hosts, through at least one service node and forwarding inter-zone traffic on a service path and through a series of services functions defined by a service chain; and
memory for storing a service topology route generated at a network device in the virtual service topology for routing traffic through a plurality of services and propagated to create said service chain comprising a sequence of service provider edge nodes and corresponding service nodes for said inter-zone traffic, said service chain comprising a series of service functions that said inter-zone traffic traverses;
wherein the service topology route identifies a virtual service topology and creates a forwarding state at the service provider edge nodes in said service chain, said virtual service topology interconnecting the zones to constrain traffic flow in a virtual private network between the zones for application of services.

11. The apparatus of claim 10 wherein the service topology route comprises a service topology route target and at least one of a service import route target and a service export route target.

12. The apparatus of claim 10 wherein the processor is further configured for receiving traffic in said service chain, forwarding the traffic to the service node, receiving the traffic from the service node, and forwarding the traffic in said service chain towards a destination.

13. The apparatus of claim 10 wherein the apparatus comprises a layer 3 virtual private network device.

14. The apparatus of claim 10 wherein the apparatus comprises a destination service device and wherein the processor is operable to generate the service topology route.

15. An apparatus comprising a processor and logic encoded on one or more non-transitory computer readable media for execution by the processor and when executed by the processor operable to:
store a service topology route for routing traffic through a plurality of services, at a network device interconnecting at least two zones comprising a plurality of hosts;
propagate the service topology route through a plurality of service provider edge nodes to create a service chain comprising a sequence of the service provider edge nodes and corresponding service nodes, said service chain comprising a series of service functions that said inter-zone traffic traverses; and
forward said inter-zone traffic on a service path and through said series of service functions defined by said service chain;
wherein the service topology route identifies a virtual service topology and creates a forwarding state at the service provider edge nodes in said service chain, said virtual service topology interconnecting the zones to constrain traffic flow in a virtual private network between the zones for application of services.

16. The apparatus of claim 15 wherein the service topology route comprises a service topology route target and at least one of a service import route target and a service export route target.

17. The apparatus of claim 15 further operable to forward traffic received in said service chain to the service node and forward the traffic received from the service node in said service chain towards a destination.

18. The apparatus of claim 15 further operable to receive a border gateway protocol message comprising service topology information.

19. The apparatus of claim 15 further operable to generate the service topology route at a destination service device.

20. The apparatus of claim 15 wherein the network devices in the service chain comprise a source service device and a destination service device, the source service device provisioned with a service topology route target and a service import route target, the destination service device provisioned with a service topology route target and a service export route target.

* * * * *